United States Patent
Chan et al.

(10) Patent No.: US 10,283,169 B1
(45) Date of Patent: May 7, 2019

(54) CONTROL OF VORTEX SHEDDING ASSOCIATED WITH A HARD DISK DRIVE DAMPER PLATE

(71) Applicant: Western Digital Technologies, Inc., San Jose, CA (US)

(72) Inventors: Andre S. Chan, Palo Alto, CA (US); Scott D. Abrahamson, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/804,391

(22) Filed: Nov. 6, 2017

(51) Int. Cl.
  *G11B 33/14* (2006.01)
  *G11B 25/04* (2006.01)

(52) U.S. Cl.
  CPC .......... *G11B 33/148* (2013.01); *G11B 25/043* (2013.01)

(58) Field of Classification Search
  None
  See application file for complete search history.

(56) References Cited

U.S. PATENT DOCUMENTS

| | | | |
|---|---|---|---|
| 6,477,000 B1 | 11/2002 | Pottebaum et al. | |
| 6,542,328 B2 | 4/2003 | Harrison et al. | |
| 6,624,966 B1 | 9/2003 | Ou-Yang et al. | |
| 6,882,501 B2 | 4/2005 | Machcha et al. | |
| 6,903,899 B2 | 6/2005 | Sakata et al. | |
| 7,064,921 B1 * | 6/2006 | Yang et al. | G11B 25/043 360/97.13 |
| 7,085,098 B1 | 8/2006 | Yang et al. | |
| 7,283,324 B2 | 10/2007 | Sasaki | |
| 7,310,199 B2 | 12/2007 | Pottebaum et al. | |
| 7,508,623 B2 | 3/2009 | Gross | |
| 7,511,917 B2 | 3/2009 | Zuo et al. | |
| 7,697,236 B2 | 4/2010 | Han et al. | |
| 8,199,426 B2 | 6/2012 | Hendriks | |
| 2002/0135933 A1 | 9/2002 | Harrison et al. | |
| 2003/0179493 A1 | 9/2003 | Kim | |
| 2005/0190488 A1 | 9/2005 | Chan et al. | |
| 2005/0286162 A1 * | 12/2005 | Sasaki | G11B 33/148 360/98.01 |
| 2007/0097545 A1 | 5/2007 | Yoo et al. | |

(Continued)

OTHER PUBLICATIONS

Andre S. Chan, Control and suppression of laminar vortex shedding off two-dimensional bluff bodies, distributed by Stanford University, Dec. 2012, 213 pages, USA, this dissertation is online at http://purl.stanford.edu/ ky960gq2435, downloaded from http://aero-comlab.stanford.edu/Papers/thesis_achan-augmented.pdf.

(Continued)

*Primary Examiner* — Craig A. Renner
(74) *Attorney, Agent, or Firm* — John D. Henkhaus (57) ABSTRACT

A hard disk drive damper plate comprises a planar main body having a generally rectangular cross-section and a splitter portion extending away from the main body in a radial direction. The splitter portion operates to disrupt vortex shedding corresponding to secondary gas flow associated with the planar main body. Various embodiments involve the length, thickness, and shape of the splitter portion, as well as how much of the planar main body may be provisioned with such a splitter portion.

21 Claims, 7 Drawing Sheets

(56) References Cited

U.S. PATENT DOCUMENTS

2011/0286131 A1* 11/2011 Teo et al. ............ G11B 33/148
　　　　　　　　　　　　　　　　　　　　　　　360/224
2017/0062018 A1    3/2017 Chan et al.

OTHER PUBLICATIONS

E.Y.K. Ng et al., Structure Optimization Study of Hard Disk Drives to Reduce Flow-Induced Vibration, The Open Numerical Methods Journal, received Aug. 18, 2011, pp. 31-41, vol. 3, Bentham Open.

* cited by examiner

CONTROL OF VORTEX SHEDDING ASSOCIATED WITH A HARD DISK DRIVE DAMPER PLATE

FIELD OF EMBODIMENTS

Embodiments of the invention may relate generally to hard disk drives and more particularly to controlling the vortex shedding associated with damper plates.

BACKGROUND

A hard-disk drive (HDD) is a non-volatile storage device that is housed in a protective enclosure and stores digitally encoded data on one or more circular disk having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head uses a magnetic field to read data from and write data to the surface of a magnetic-recording disk. A write head makes use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

Because the recording disks spin within an HDD during operation, gas flow is generated. Indeed, the air bearing slider (or, generally, gas bearing slider) on which the read-write head is housed relies on such gas flow in order to fly over the disk in order to function as purposed. However, such gas flow generated within an HDD can have detrimental effects when impinging upon or interacting with the disk stack and the head stack assembly (HSA), for example, such as by contributing to imparting unwanted flow induced vibration (FIV) upon the disks and/or HSA. FIV can negatively impact head positioning accuracy thereby leading to track misregistration (TMR), which essentially refers to the mis-location of the read-write head relative to its desired location, of which there are numerous components. Hence, controlling the gas flow within an HDD is considered an ongoing design challenge.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to a damper plate are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Embodiments may be used in the context of a damper plate for a hard disk drive (HDD). Thus, in accordance with an embodiment, a plan view illustrating an HDD 100 is shown in FIG. 1 to illustrate an exemplary operating context.

Figure 1:
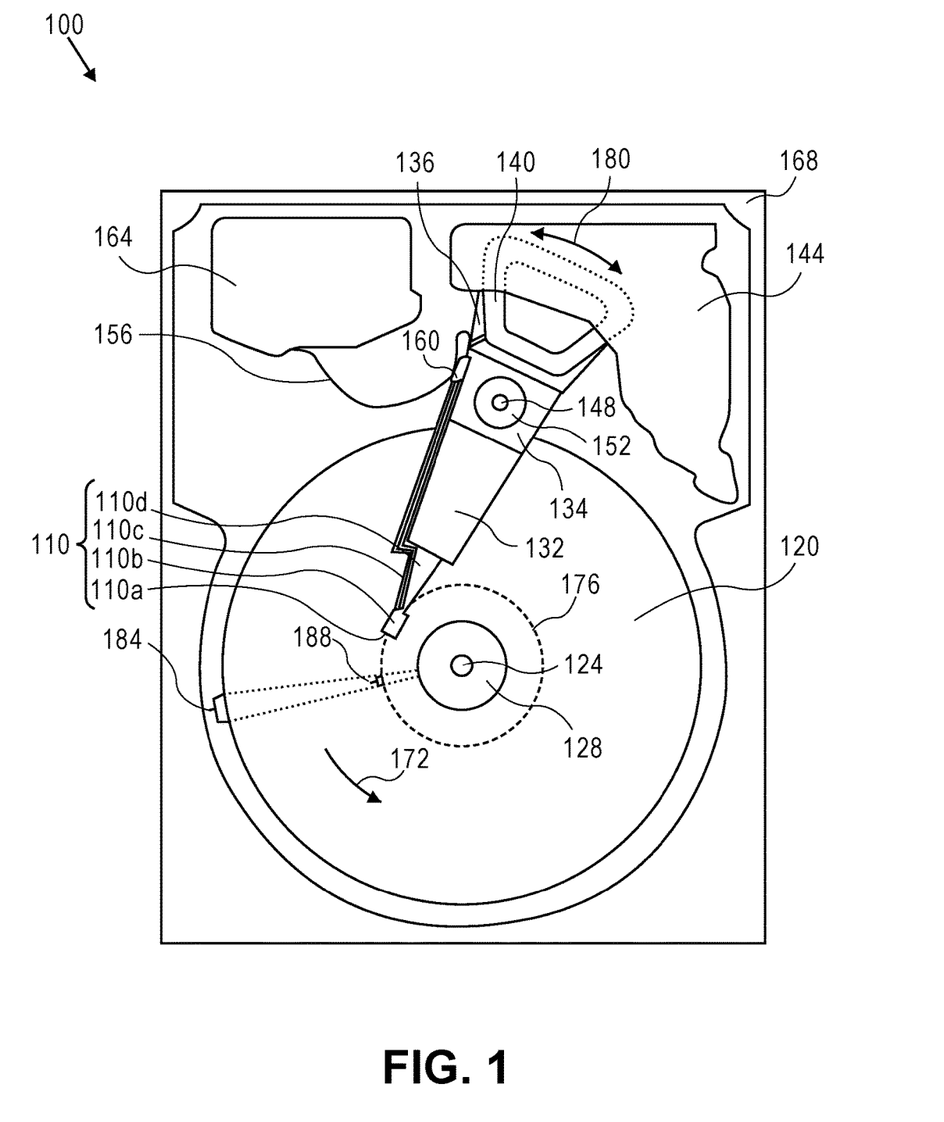
FIG. 1 is a plan view illustrating a hard disk drive (HDD), according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

INTRODUCTION

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a sidewall as "substantially vertical" would assign that term its plain meaning, such that the sidewall is vertical for all practical purposes but may not be precisely at 90 degrees.

As discussed, the gas flow generated within an HDD can have detrimental effects when impinging upon or interacting with the disk stack, such as by contributing to unwanted flow induced vibration (FIV) upon the disks, which can negatively impact head positioning accuracy thereby leading to track misregistration (TMR). Furthermore, one restriction that may be encountered in controlling gas flow within an HDD may be the lack of useable volume within the drive that might be needed for incorporating control mechanisms into the drive. Thus, one available approach to controlling the gas flow within a multi-disk HDD is the use of damper plates.

Damper Plates

Figure 2:
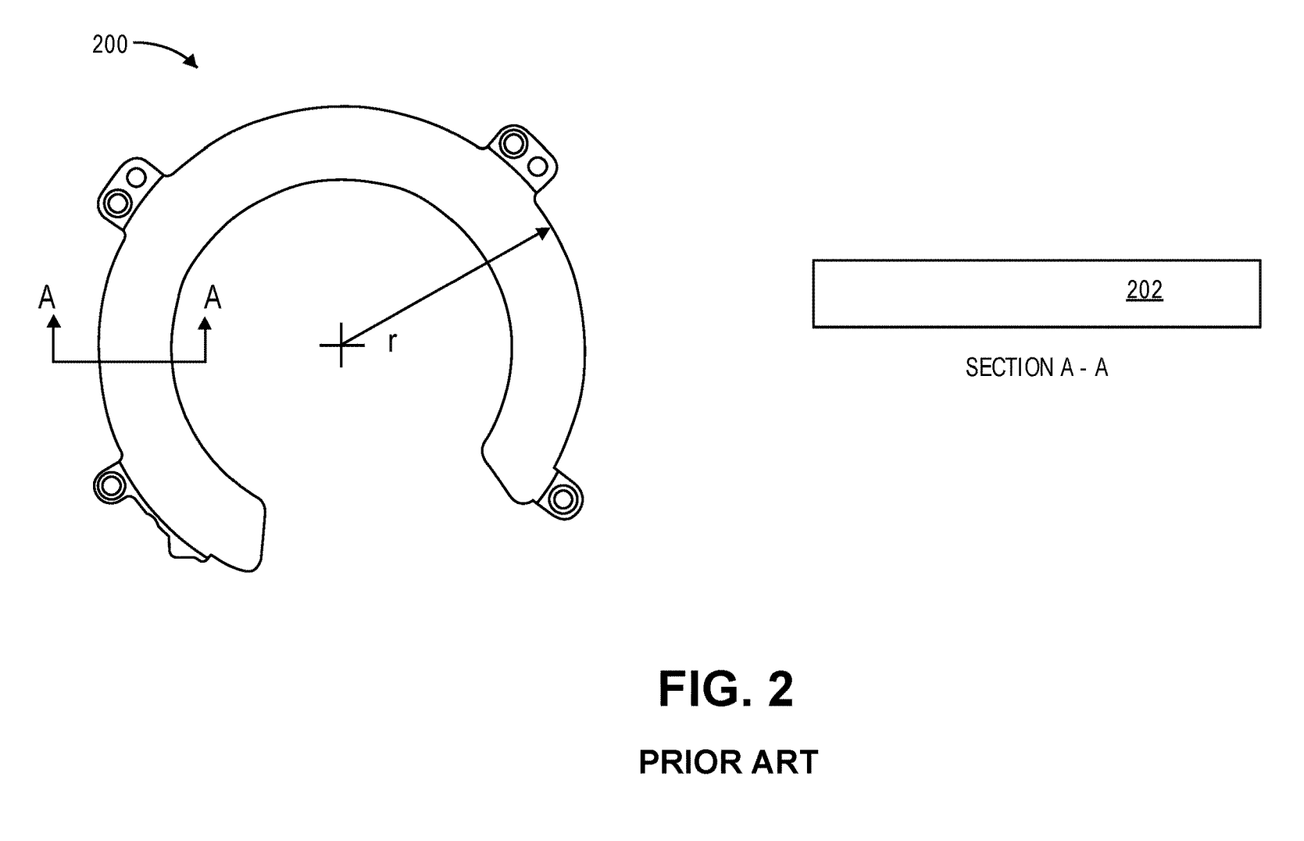
FIG. 2 is a plan view illustrating an example of a conventional HDD damper plate.

FIG. 2 is a plan view illustrating an example of a conventional HDD damper plate. Damper plate 200 is an annular structure interposed between adjacent disks in the disk stack, typically at the outer diameter of the disks (see, e.g., FIG. 3). The "radial direction" is depicted by the radius, r. That is, the "radial direction" generally refers to the direction between the center of the damper plate 200 and the outer circumference of the damper plate 200. FIG. 2 further depicts a section A-A of damper plate 200, referenced as section 202. Herein, according to embodiments a damper plate such as damper plate 200 is referred to as a "planar" damper plate, meaning its cross-section is largely or substantially rectangular shaped, as depicted by section 202. Hence, a planar damper plate such as damper plate 200 has minimal to no edge rounding, or rounding of the corners, as with section 202.

The primary purpose of damper plates is to interrupt the formation of vertical gas flow structures at the disk periphery which can excite vertical vibration of the disks. Damper plates retard the gas flow, thereby extracting flow energy which can excite vibration of the disks and arms, which in turn attenuates the FIV inside the disk stack to a manageable level. As such, the larger the damper plate (i.e., extending closer to the spindle motor hub and the inner diameter of the disks), the more effective it is for lowering track misregistration (TMR). Additionally, the effectiveness of a damper plate is controlled by its thickness. As the thickness increases, thereby reducing the disk-to-damper-plate spacing, more attenuation in disk vibration can be realized. This is because the decrease in disk-to-damper-plate spacing effectively lowers the local Reynolds number, thereby reducing the turbulent intensity of the gas flow in the disk stack. However, concerns with the use of a full damper plate, filling as much space between adjacent disks with solid material as physically and operationally possible, include the additional exposure to shock issues, the additional power penalties, and manufacturing assembly limitations. Furthermore, as with any mechanism positioned within the disk stack (e.g., spoilers, diverters), damper plates also shed damaging gas flow wakes that exacerbate FIV. Thus, the gas flow characteristics between the inner diameter of a damper plate and the outer diameter of the spindle motor (or of a disk spacer, if present) are key to controlling FIV associated with the disk stack.

Therefore, one approach to controlling FIV is to control the "secondary flow" inside the disk stack. Secondary flow is the gas flow in the radial (r) direction and the axial direction normal to the radial direction (e.g., normal to the plan view of damper plate 200 in FIG. 2), essentially due to Ekman layer pumping, a fluid transport mechanism. Vortex shedding occurs as a result of this secondary flow, especially in instances of sharp corners, where vortex shedding refers to an oscillating flow that may occur when a fluid flows past a bluff body.

Figure 3:
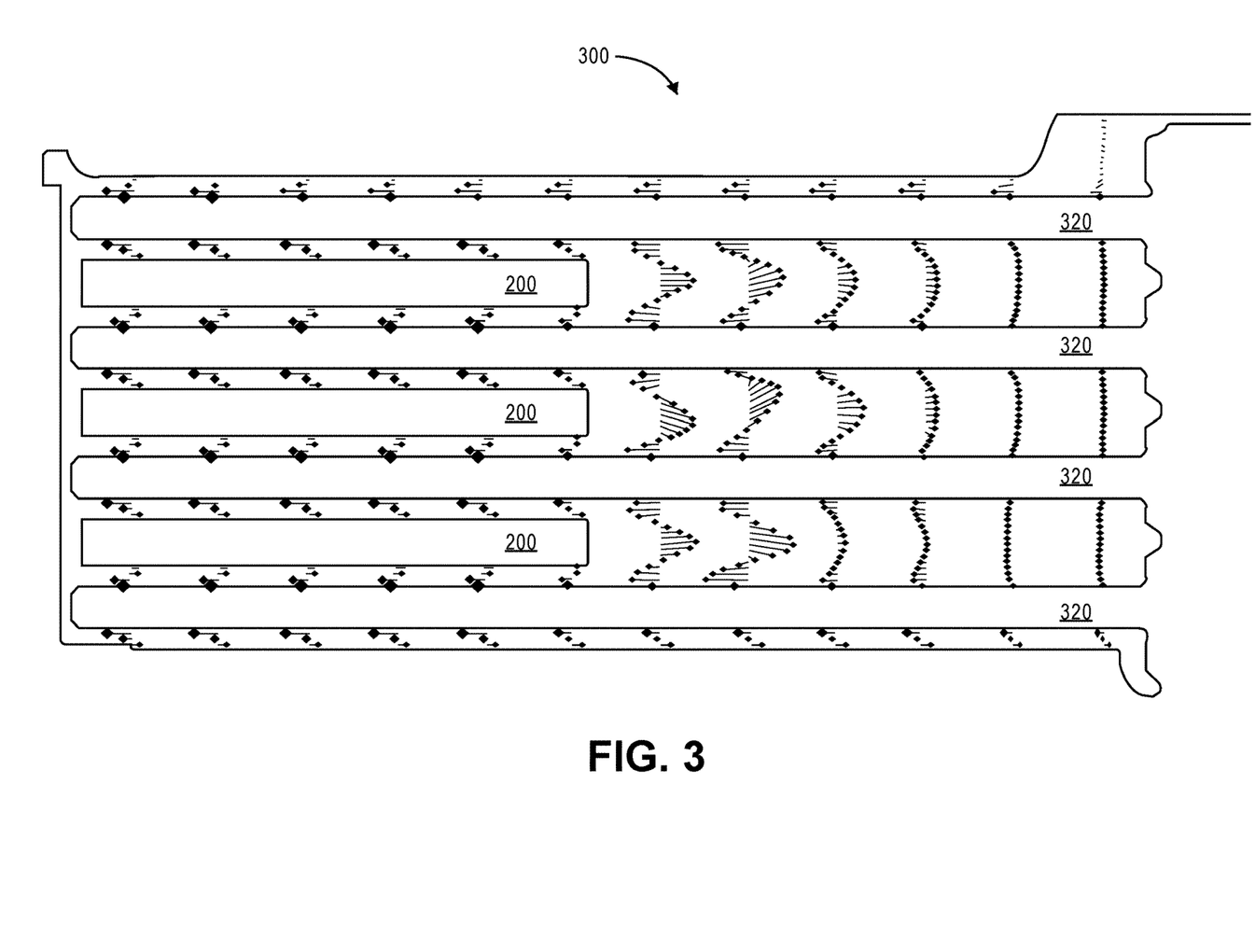
FIG. 3 is a diagram illustrating an instantaneous radial velocity plot associated with an HDD damper plate of FIG. 2 interposed between adjacent spinning disks.

FIG. 3 is a diagram illustrating an instantaneous radial velocity plot associated with an HDD damper plate of FIG. 2 interposed between adjacent spinning disks. FIG. 3 depicts multiple instance of a damper plate 200 interposed between an adjacent pair of disks 320 at the outer diameter of the disks 320. The instantaneous radial velocity plot 300 (note the tiny vectors/arrows) indicates the fluctuation of gas flow due to Ekman layer and secondary flow vortex shedding. Vortex shedding depends on the gas flow velocity as well as the size and shape of the body and, therefore, vortex shedding would likely be present with a damper plate having a rectangular cross-section such as section 202 (FIG. 2) of damper plate 200 (FIG. 2). In the context of the radial velocity plot 300, it is at least in part the secondary flow vortex shedding that can cause the gas flow fluctuation that drives the residual FIV.

Damper Plate with a Splitter Mechanism

An approach to controlling the vortex shedding associated with or corresponding to the secondary gas flow involves the use of a damper plate having a splitter mechanism, whereby the splitter mechanism can help prevent eddies from interacting undesirably.

Figure 4:
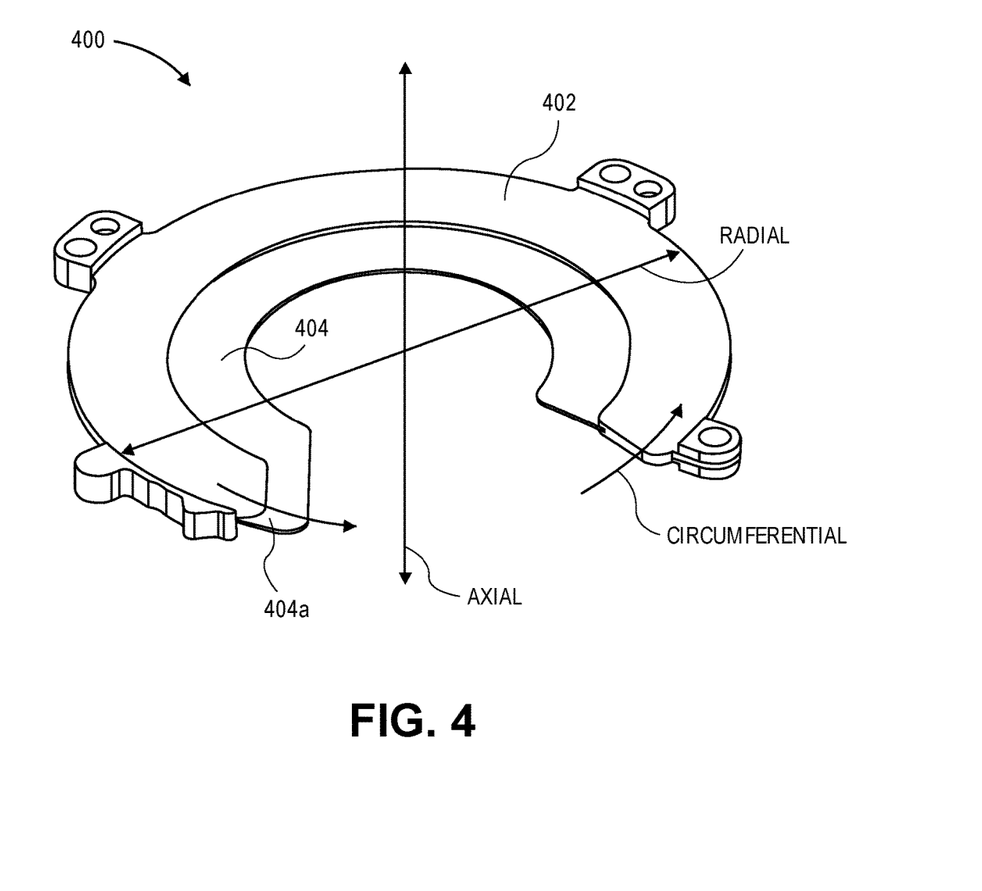
FIG. 4 is a perspective view illustrating an HDD damper plate, according to an embodiment.

FIG. 4 is a perspective view illustrating an HDD damper plate, according to an embodiment. A damper plate 400 is depicted in reference to a radial direction between the center and outer diameter, an axial direction normal to the radial direction, and a circumferential direction that generally follows the annular shape of the damper plate 400. Damper plate 400 comprises a planar main body 402, which has a substantially rectangular cross-section (see, e.g., section 202 of FIG. 2), and a splitter portion 404 (or simply splitter 404) extending away from the main body 402 in the radial direction. Thus, the splitter portion 404 of damper plate 400, when positioned in a circumferential gas flow (such as the gas flow generated by spinning disks in an HDD), operates to disrupt the vortex shedding corresponding to the secondary flow from the planar main body 402. Stated otherwise, including the splitter portion 404 at the inner diameter of the main body 402 serves to disrupt the formation of vortex wakes, thereby disrupting the vortex shedding process, particularly in the radial direction.

Figure 5:
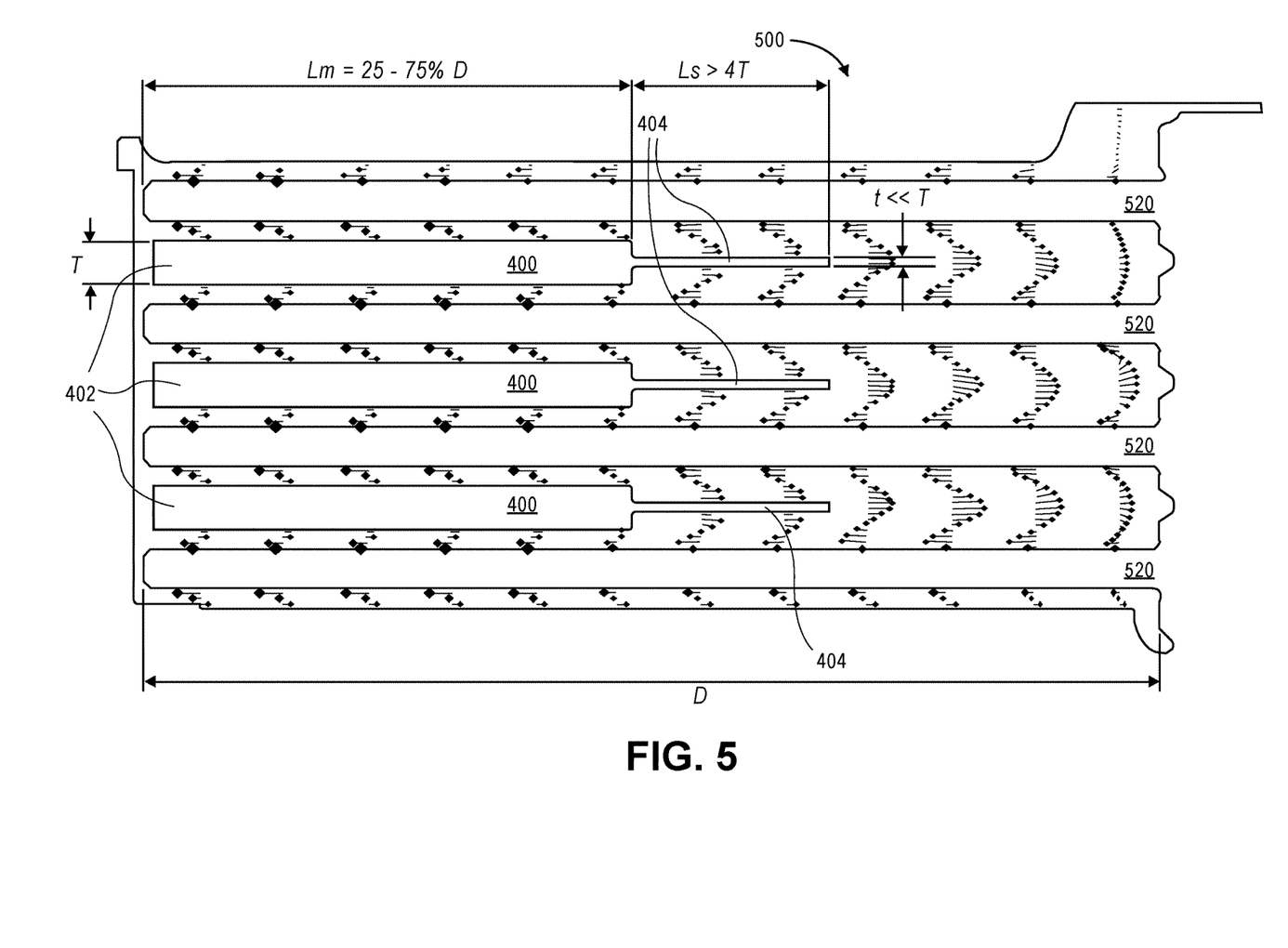
FIG. 5 is a diagram illustrating an instantaneous radial velocity plot associated with an HDD damper plate of FIG. 4 interposed between adjacent spinning disks, according to an embodiment.

FIG. 5 is a diagram illustrating an instantaneous radial velocity plot associated with an HDD damper plate of FIG. 4 interposed between adjacent spinning disks, according to an embodiment. FIG. 5 depicts multiple instance of a damper plate 400 interposed between an adjacent pair of disks 520 toward the outer diameter of the disks 520. The instantaneous radial velocity plot 500 (note the tiny vectors/arrows) indicates the fluctuation of gas flow due to Ekman layer and secondary flow vortex shedding, which is present with a damper plate having a rectangular cross-section such as section 402 of damper plate 400. In the context of the radial velocity plot 500, it is noted that the instantaneous radial velocity is more uniform and stable than that illustrated in reference to FIG. 3 and that the wakes coming off the main body 402 are more streamlined. The result is that a significantly "quieter" zone is generated in the inner disk stack cavity through the use of a damper plate such as damper plate 400 than with use of damper plate 200 (FIGS. 2 and 3), with respect to the pressure RMS (root mean square) in the disk stack cavity.

Vortex Shedding Control Feature

The splitter portion 404 (FIG. 4), extending from the main body 402 of damper plate 400 (FIG. 4), can be generally characterized as a vortex shedding control feature which inhibits or disrupts the vortex shedding process due to secondary gas flow. Various embodiments of such a control feature are described hereafter.

With reference back to FIG. 5 and according to embodiments, dimensional structural relationships among the main body 402 and the splitter portion 404, for the splitter portion 404 to be effective as a vortex suppression device, are presented as follows, where D=the radial distance between the inner and outer diameters of the disks 520;

T=the thickness of the main body 402;

t=the thickness of the splitter portion 404;

t<<T;

Lm=25% to 75% of D; and

Ls>4T.

It is noteworthy that Ls should be sufficiently long, i.e., Ls>4T, for the purposes of a vortex suppression device. Hence, the end of the splitter portion 404 preferably should not overlap with any disk spacer or other structural feature extending radially from the disk spindle motor hub. Also note that t should be significantly less than T but thick enough to be structurally sound. For example, a typical thickness of splitter portion 404 may be approximately 10% to 20% of T. The foregoing dimensional guidelines are further applicable to the embodiments illustrated in FIGS. 6A-8.

With reference to FIG. 4 and according to an embodiment, the splitter portion 404 includes a primary flow portion 404a extending away from the main body 402 in the circumferential direction (e.g., in the direction of the primary flow), where this primary flow portion 404a serves to control vortex shedding from the primary flow direction. Note that the splitter portion 404 and the conjoined primary flow portion 404a should preferably be continuous and/or contiguous in order to avoid tripping the flow.

Figure 6A:
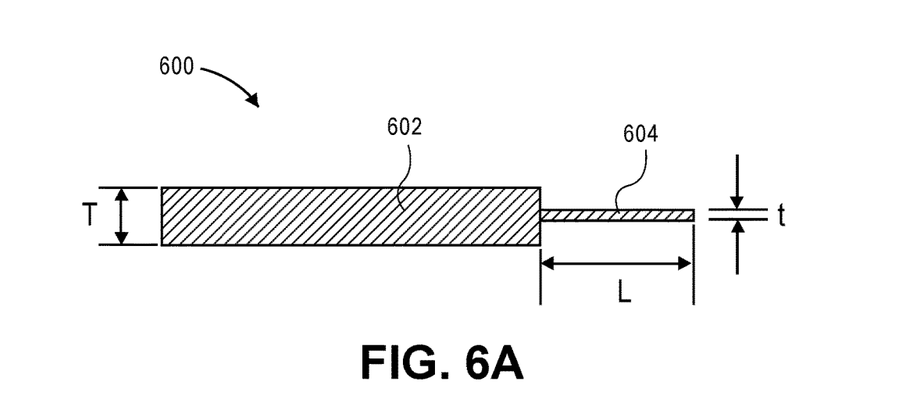
FIG. 6A is a side cross-sectional view of an HDD damper plate, according to a first embodiment.
Figure 6B:
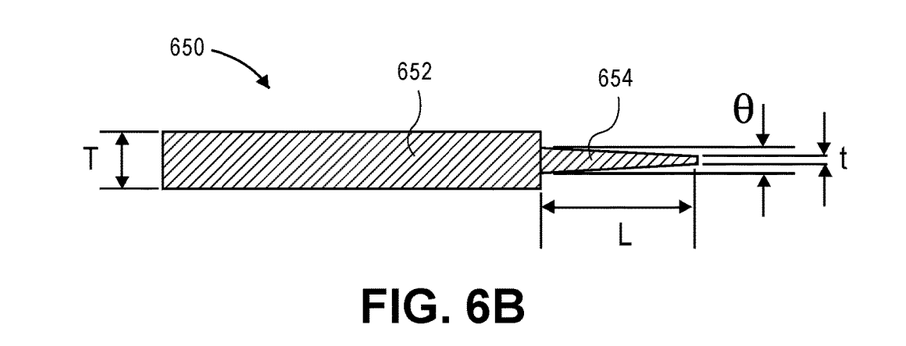
FIG. 6B is a side cross-sectional view of an HDD damper plate, according to a second embodiment.
Figure 6C:
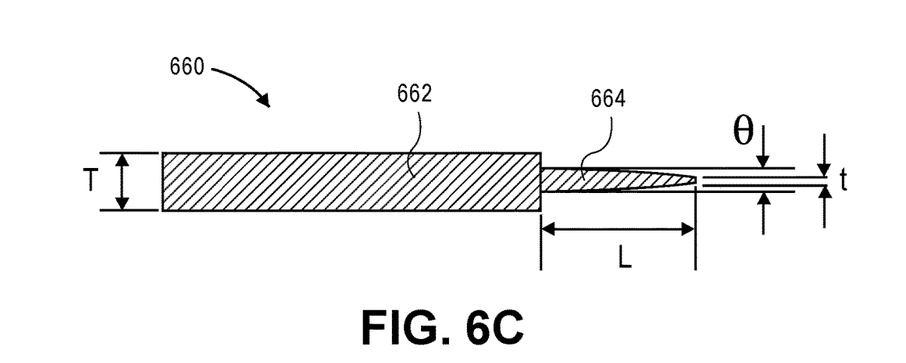
FIG. 6C is a side cross-sectional view of an HDD damper plate, according to a third embodiment.

FIG. 6A is a side cross-sectional view of an HDD damper plate, according to a first embodiment. Damper plate 600 comprises a planar main body 602 having a thickness, T, and a splitter portion 604 having a thickness, t, and a length, L. According to an embodiment, splitter portion 604 has a substantially rectangular cross-section (e.g., as depicted in FIG. 6A). The following general structural relationships apply to the damper plate 600, as well as to damper plate 650 (FIG. 6B) and damper plate 660 (FIG. 6C):

$$0<t<T;$$

$$0<L.$$

According to respective embodiments, to desirably disrupt the vortex shedding process due to secondary gas flow, the following structural relationships apply to the damper plate 600:

$$t<0.25T;$$

$$L\geq 4T.$$

FIG. 6B is a side cross-sectional view of an HDD damper plate, according to a second embodiment. Damper plate 650 comprises a main body 652 (planar, according to an embodiment) having a thickness, T, and a splitter portion 654 having a proximal thickness, θ, a terminal thickness, t, and a length, L, where t<θ≤T and where the splitter portion 654 tapers substantially linearly from θ to t. The proximal thickness θ is the thickness of the splitter portion 654 at the interface with the main body 652, i.e., the thickest portion of splitter portion 654. The terminal thickness t is the thickness of the splitter portion 654 at its terminal end, i.e., the thinnest portion of splitter portion 654.

FIG. 6C is a side cross-sectional view of an HDD damper plate, according to a third embodiment. Damper plate 660 comprises a main body 662 (planar, according to an embodiment) having a thickness, T, and a splitter portion 664 having a proximal thickness, θ, a terminal thickness, t, and a length, L, where t<θ≤T and where the splitter portion 654 tapers curvilinearly from θ to t. The proximal thickness θ is the thickness of the splitter portion 664 at the interface with the main body 662, i.e., the thickest portion of splitter portion 664. The terminal thickness t is the thickness of the splitter portion 664 at its terminal end, i.e., the thinnest portion of splitter portion 664.

In reference to each of FIGS. 6A-6C, for example, according to an embodiment the splitter portion (e.g., splitter portion 604, 654, 664) is symmetric about a midplane corresponding to the radial direction. A representation of a midplane is not shown in FIGS. 6A-6C in order to maintain clarity, however, such a midplane can be visualized as extending into the view/paper and symmetrically segregating the axially upper half of the splitter portion and the axially lower half of the splitter portion. It is to be appreciated that the damper plate 660 embodiment depicted in FIG. 6C includes a relatively more streamlined splitter portion 664 than the damper plate 600, 650 embodiments depicted in FIGS. 6A, 6B, respectively, which, at some certain Reynolds numbers can in turn help shape the flow to become more "streamlined" as well. Furthermore, even if the flow unsteadiness is not completely suppressed, a more streamlined splitter portion can still help attenuate the vortex shedding intensity, which is desirable.

Figure 7A:
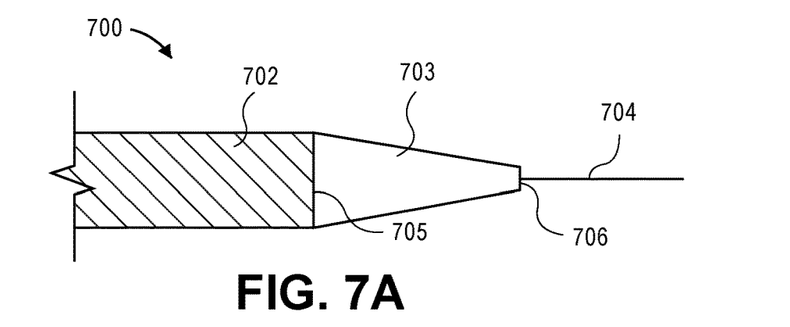
FIG. 7A is a side cross-sectional view of an HDD damper plate, according to a fourth embodiment.

FIG. 7A is a side cross-sectional view of an HDD damper plate, according to a fourth embodiment. Damper plate 700 comprises a main body 702 (planar, according to an embodiment), an intermediate portion 703 extending away from the main body 702 in the radial direction and from which a splitter portion 704 extends further away in the radial direction. According to an embodiment and as depicted in FIG. 7A, the intermediate portion 703 tapers substantially linearly from the proximal interface 705 with the main body 702, i.e., the thickest portion of intermediate portion 703, to the distal interface 706 with the splitter portion 704, i.e., the thinnest portion of intermediate portion 703. According to a related embodiment, the splitter portion 704 has a blade-like structure, i.e., a significantly thin structure (e.g., negligible to marginal thickness) that is capable of being stably cantilevered from the intermediate portion 703. With a damper plate such as damper plate 700, the splitter portion 704 may extend further toward the inner diameter of the disk(s) (see, e.g., disks 520 of FIG. 5) than the splitter portion 404 (FIG. 5) and, consequently, further desirably disrupt the secondary gas flow vortex shedding process.

Figure 7B:
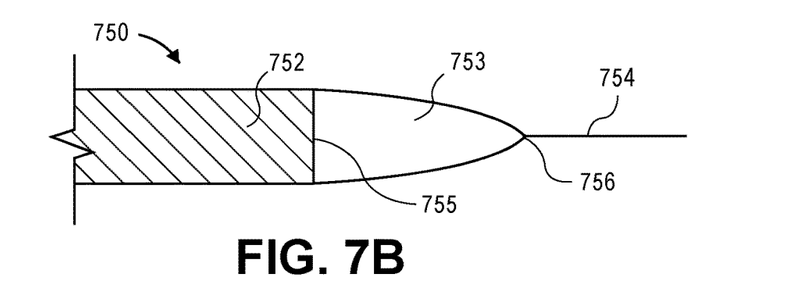
FIG. 7B is a side cross-sectional view of an HDD damper plate, according to a fifth embodiment.

FIG. 7B is a side cross-sectional view of an HDD damper plate, according to a fifth embodiment. Damper plate 750 comprises a main body 752 (planar, according to an embodiment), an intermediate portion 753 extending away from the main body 752 in the radial direction and from which a splitter portion 754 extends further away in the radial direction. According to an embodiment and as depicted in FIG. 7B, the intermediate portion 753 tapers curvilinearly from the proximal interface 755 with the main body 752, i.e., the thickest portion of intermediate portion 753, to the distal interface 756 with the splitter portion 754, i.e., the thinnest portion of intermediate portion 753. According to a related embodiment, the splitter portion 754 has a blade-like structure, i.e., a significantly thin structure (e.g., negligible to marginal thickness) that is capable of being stably cantilevered from the intermediate portion 753. With a damper plate such as damper plate 750, the splitter portion 754 may extend further toward the inner diameter of the disk(s) (see, e.g., disks 520 of FIG. 5) than the splitter portion 404 (FIG. 5) and, consequently, further desirably disrupt the secondary gas flow vortex shedding process. It is to be appreciated that the damper plate 750 embodiment depicted in FIG. 7B includes a relatively more streamlined intermediate portion 753 than the damper plate 700 embodiment depicted in FIG. 7A which, at some certain Reynolds numbers can in turn help shape the flow to become more "streamlined" as well.

As discussed, even if the flow unsteadiness is not completely suppressed, a more streamlined splitter portion can still help attenuate the vortex shedding intensity, which is desirable.

Figure 8:
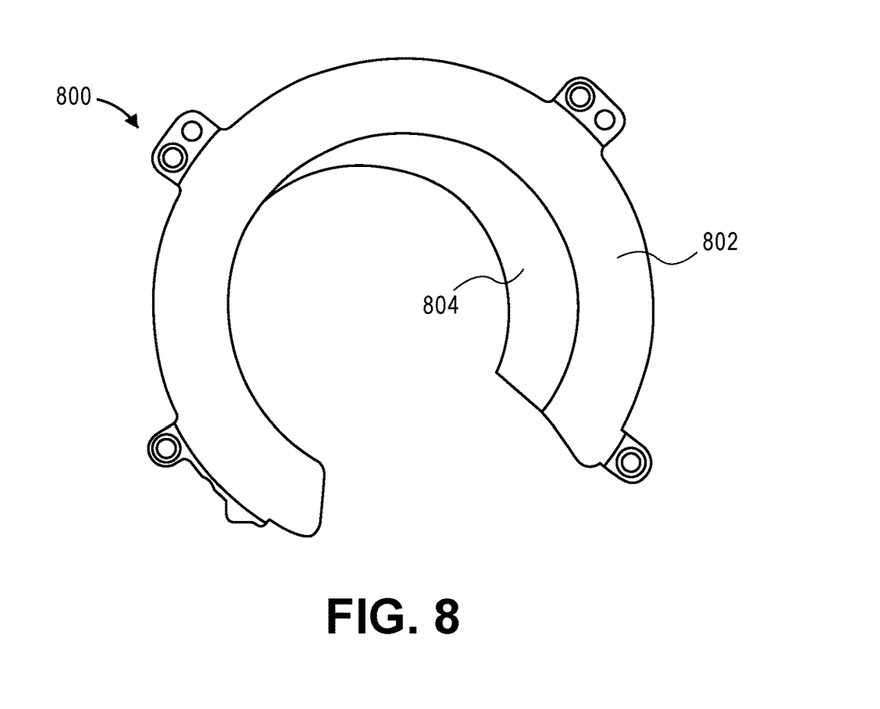
FIG. 8 is a plan view of an HDD damper plate, according to an embodiment.

FIG. 8 is a plan view of an HDD damper plate, according to an embodiment. Damper plate 800 comprises a planar main body 802, which has a substantially rectangular cross-section (see, e.g., section 202 of FIG. 2), and a splitter portion 804 extending away from the main body 802 in the radial direction. Similarly to damper plate 400 (FIG. 4), the splitter portion 804 of damper plate 800, when positioned in a circumferential gas flow (such as the gas flow generated by spinning disks in an HDD), operates to disrupt the vortex shedding corresponding to the secondary flow from the planar main body 802. However, in contrast with damper plate 400, in which the splitter portion 404 extends from the main body 402 in the radial direction along the entirety of the circumferential length of the main body 402, with damper plate 800 the splitter portion 804 extends from the main body 802 in the radial direction along only a portion of the circumferential length of the main body 802, according to an embodiment.

Furthermore and according to an embodiment, a damper plate such as damper plate 800 may be configured with a splitter portion 804 (which has a radial width in the radial direction) that extends from the main body 802 in the radial direction and where the width of the splitter portion tapers along at least a portion of the circumferential length of the main body 802, e.g., as depicted in FIG. 8. Structural configurations for a tapered splitter portion (e.g., splitter portion 804), in relation to the circumferential length of a main body (e.g., main body 802), may vary from implementation to implementation. For example, the rate at which the splitter portion width tapers, and the portion of the main body from which the splitter portion extends, may vary based on various HDD design constraints and secondary gas flow vortex shedding disruption goals and the like.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A hard disk drive damper plate for interposing between adjacent recording disk media, the damper plate comprising:
   one or more mounting portions at respective locations around an outer perimeter of said damper plate,
   a planar main body extending away from said one or more mounting portions a first distance and having a substantially rectangular cross-section; and
   a splitter portion extending away from said main body a second distance in a radial direction, and comprising a primary flow portion having a thickness less than that of said main body and extending away from said main body in a circumferential direction in a direction of primary circumferential gas flow;
   wherein said splitter portion operates to disrupt vortex shedding corresponding to said circumferential gas flow and corresponding to secondary flow associated with said planar main body.

2. The damper plate of claim 1,
   wherein said planar main body has a thickness in an axial direction normal to said radial direction and said splitter portion has a length in said radial direction; and
   wherein said length is at least four times said thickness.

3. The damper plate of claim 1,
   wherein said planar main body and said splitter portion each have a respective thickness in an axial direction normal to said radial direction; and
   wherein said thickness of said splitter portion is approximately one fourth said thickness of said main body.

4. The damper plate of claim 1, wherein said splitter portion has a substantially rectangular cross-section.

5. The damper plate of claim 1, wherein the thickness of said splitter portion tapers from thicker to thinner in said radial direction away from said main body.

6. The damper plate of claim 1, wherein said splitter portion comprises an upper surface and a lower surface and wherein said upper and lower surfaces are curvilinear.

7. The damper plate of claim 1, wherein said splitter portion is symmetric about a midplane corresponding to said radial direction.

8. The damper plate of claim 1, said damper plate further comprising:
   an intermediate portion extending away from said main body in said radial direction and from which said splitter portion extends further in said radial direction, said intermediate portion having a non-rectangular cross-section.

9. The damper plate of claim 1, wherein said planar main body has a circumferential length, and wherein said splitter portion extends from said main body in said radial direction along the entirety of said circumferential length.

10. The damper plate of claim 1, wherein said splitter portion has a blade-like structure.

11. A hard disk drive comprising:
   a plurality of recording disk media rotatably mounted on a spindle;
   a head slider comprising a read-write transducer configured to read from and to write to at least one of said disk media;
   a voice coil actuator configured to move said head slider to access portions of said at least one disk media; and
   a damper plate interposed between two adjacent disk media and extending in a direction toward the center of said disk media, said damper plate comprising:
      one or more mounting portions at respective locations around an outer perimeter of said damper plate,
      a planar main body extending away from said one or more mounting portions a first distance between adjacent said disk media and having a substantially rectangular cross-section, and a splitter portion extending away from said main body a second distance further in a radial direction toward said center of said disk media, and comprising a primary flow portion having a thickness less than that of said main body and extending away from said main body in a circumferential direction in a direction of primary gas flow.

12. The hard disk drive of claim 11, wherein said splitter portion operates to disrupt vortex shedding corresponding to secondary gas flow associated with said planar main body.

13. The hard disk drive of claim 12, wherein said planar main body has approximately zero edge rounding associated with the corners of said rectangular cross-section.

14. The hard disk drive of claim 11,
wherein said planar main body has a thickness in an axial direction normal to said radial direction and said splitter portion has a length in said radial direction; and
wherein said length is at least four times said thickness.

15. The hard disk drive of claim 11,
wherein said planar main body and said splitter portion each have a respective thickness in an axial direction normal to said radial direction; and
wherein said thickness of said splitter portion is approximately one fourth said thickness of said main body.

16. The hard disk drive of claim 11, wherein said splitter portion has a substantially rectangular cross-section.

17. The hard disk drive of claim 11, wherein the thickness of said splitter portion tapers from thicker to thinner in said radial direction away from said main body.

18. The hard disk drive of claim 11, wherein said splitter portion comprises an upper surface and a lower surface and wherein said upper and lower surfaces are curvilinear.

19. The hard disk drive of claim 11, said damper plate further comprising:
an intermediate portion extending away from said main body in said radial direction and from which said splitter portion extends further in said radial direction, said intermediate portion having a non-rectangular cross-section.

20. The hard disk drive of claim 19, wherein said splitter portion has a blade-like structure.

21. The hard disk drive of claim 11, wherein said planar main body has a circumferential length, and wherein said splitter portion extends from said main body in said radial direction along the entirety of said circumferential length.

* * * * *